United States Patent [19]

Willhelm et al.

[11] 4,364,180

[45] Dec. 21, 1982

[54] INSTRUMENTATION FOR SENSING THE TEST VALUES AT TEST SAMPLES

[75] Inventors: Jörg Willhelm, Nauborn; Hans-Dieter Jacoby, Werdorf; Erich Schuster, Hüttenberg; Dieter Prinz, Biebertal, all of Fed. Rep. of Germany

[73] Assignee: Ernst Leitz Wetzlar GmbH, Wetzlar, Fed. Rep. of Germany

[21] Appl. No.: 204,842

[22] Filed: Nov. 7, 1980

[30] Foreign Application Priority Data

Nov. 24, 1980 [DE] Fed. Rep. of Germany ....... 2947394

[51] Int. Cl.³ .............................................. G01B 7/28
[52] U.S. Cl. .............................. 33/174 L; 33/172 E; 33/179.5 R
[58] Field of Search ............. 33/174 L, 172 E, 169 R, 33/143 L, 147 N, 148 H, 169 C, 172 D, 179.5 R, 179.5 D

[56] References Cited

U.S. PATENT DOCUMENTS 3,673,695 7/1972 Rethwish ........................ 33/174 L
4,138,823 2/1979 McMurtry ...................... 33/174 L
4,155,171 5/1979 McMurtry ...................... 33/174 L
4,288,925 9/1981 McMurtry ...................... 33/172 E

FOREIGN PATENT DOCUMENTS 2712181 9/1978 Fed. Rep. of Germany .... 33/174 L
2408813 7/1979 France ............................. 33/174 L
2045437 10/1980 United Kingdom ............. 33/174 L Primary Examiner—Willis Little
Attorney, Agent, or Firm—Wells & Wells

[57] ABSTRACT

Instrumentation for sensing the test values at test samples, using a mechanical sensor moving relative to the test sample and consisting of a housing fixed part and of a movable, articulating multi ball and socket part connected to the housing fixed part and at least one test value transmitter. A trigger signal is generated in the instrumentation at the instant of impact between sensor and test sample and is stored to record the test value present at the time of impact at the test value transmitter.

At least one force or acceleration pickup (12,23,24,30) is provided which is mounted on the housing fixed part (2) of the sensor (5) and delivers the trigger signal.

4 Claims, 4 Drawing Figures

U.S. Patent   Dec. 21, 1982   4,364,180
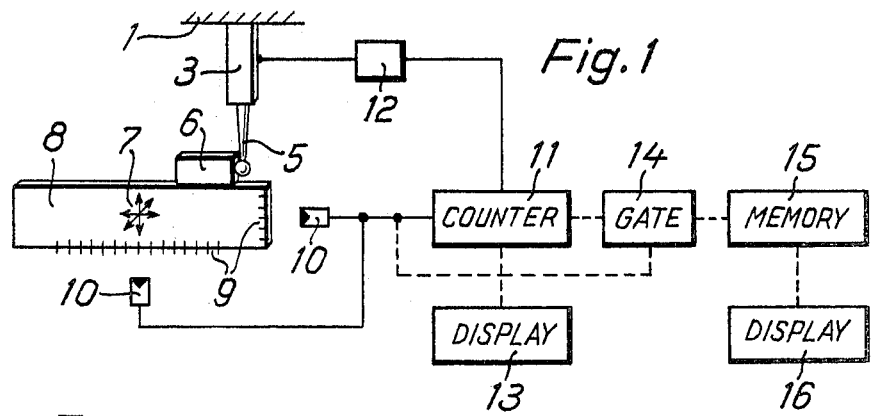
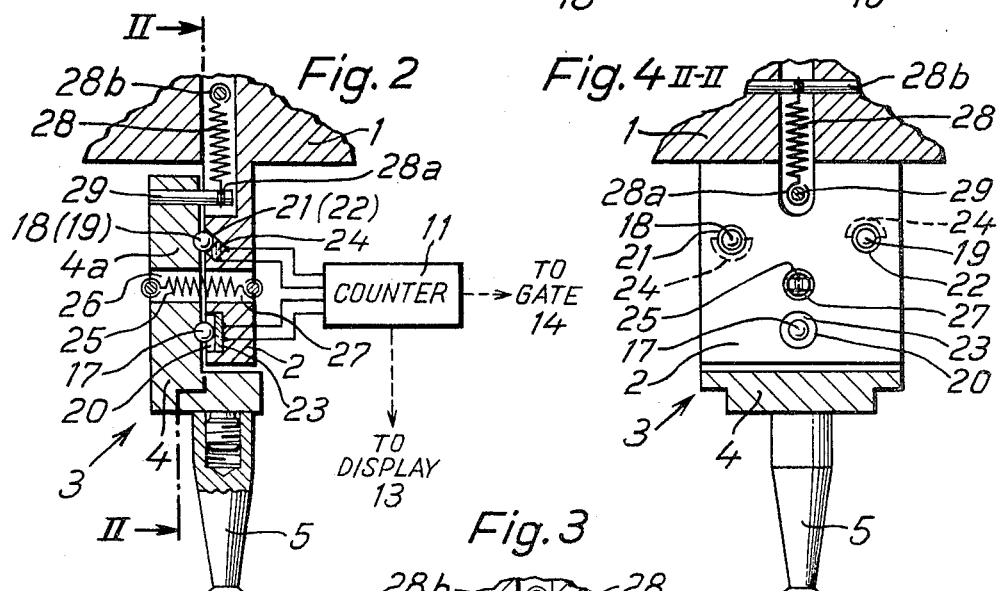
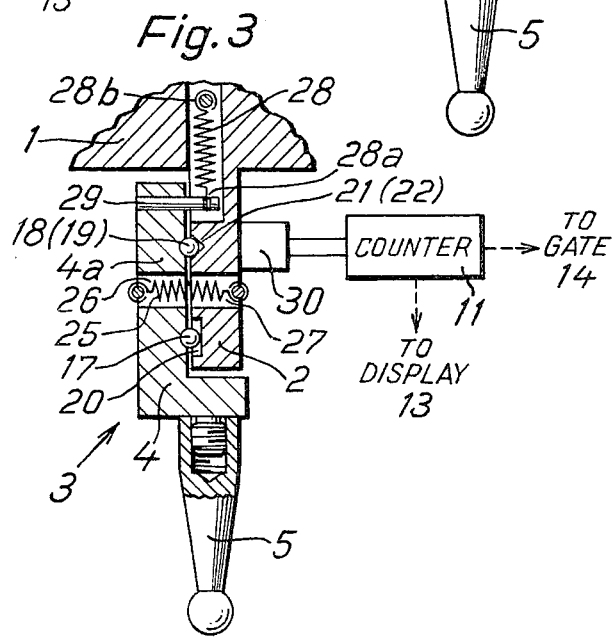

INSTRUMENTATION FOR SENSING THE TEST VALUES AT TEST SAMPLES

CROSS-REFERENCES TO RELATED APPLICATIONS

Applicants claim priority under 35 U.S.C. 119 for application P No. 29 47 394.7, filed Nov. 24, 1979 in the Patent Office of the Federal Republic of Germany.

The disclosure of assignee's copending application Ser. No. 183,725, filed Sept. 3, 1980 is incorporated herein to show the state of the art of contact sensors and the circuits and circuit components used therein.

BACKGROUND OF THE INVENTION

The field of the invention is geometrical instruments having pivoted contacts and the present invention is particularly concerned with a mechanical sensor moving relative to the instrumentation and consisting of one part which is fixed to the housing and of another part which is movable but connected to the first part by an articulating multi ball and socket member.

At least one test-value transmitter detects the relative motion between the test sample and the sensor. A counter follows the sensor and a signal is generated in the apparatus at the instant of impact between the sensor and the test sample, this signal then being stored in a memory. The memory stores the test value present at the test-value transmitter at the instant of impact.

The state of the art of contact sensors may be ascertained by reference to U.S. Pat. Nos. 3,905,119 and 3,945,124; West German Pat. No. 2,440,692; West German patent application No. 1,804,253 and West German Utility Pat. Nos. 7 231 877 and 7 400 071, the disclosures of which are incorporated herein.

West German patent application No. 2,820,813 of Hans-Dieter Jacoby and Erich Schuster, published Nov. 15, 1979 and West German patent application 2,712,181 of Walter Werner, Klaus Herzog and Franz Szenger published Sept. 21, 1978 are incorporated herein to show sensing systems for sensing the test values at test samples.

Sensing systems for sensing the test values at test samples are known from West German patent application No. 2,712,181, wherein the movable parts consist of two pieces firmly joined together and between which are mounted one or more pickups sensitive to tension or compression, and wherein the connection between the housing fixed part and the movable part is implemented by an articulating member precisely determining the height of the movable part with respect to that fixed to the housing.

Further instrumentation for sensing the test values at test samples using a mechanical sensor moving with respect to the test samples and at least one test value transmitter is known, from West German patent application No. 2,820,813, wherein at the time of impact between sensor and test sample, a signal is generated for storing the test value at the time of impact at the test value transmitter in a memory and wherein the sensor consists of a housing fixed part and another integral part moving relative to the housing fixed part, at least one vibration or acceleration pickup being externally mounted on the movable part.

The instruments disclosed in West German Pat. applications Nos. 2,712,181 and 2,820,813 both suffer from the drawback that their high sensitivity makes them susceptible to spurious signals. To discriminate between spurious and sensing signals either a pulse identifying sensing must be generated additionally or a discriminator circuit, for choosing between the different oscillatory behaviors in sensor and spurious signals, must be provided. Both steps represent increased technical complexity with corresponding increased costs.

SUMMARY OF THE INVENTION

It is therefore an object of the present invention to create instrumentation which does not require high technical complexity while retaining high sensing sensitivity.

This object is achieved according to the present invention by instrumentation for sensing the test values at test samples, using a mechanical sensor moving relative to the test sample and consisting of a housing fixed part and of a movable, articulating multi ball and socket part connected to the housing fixed part, and at least one test value transmitter, a trigger signal being generated in the instrumentation at the instant of impact between sensor and test sample and being stored to record the test value present at the time of impact at the test value transmitter, wherein at least one force or acceleration pickup (12,23,24,30) is provided which is mounted on the housing fixed part (2) of the sensor (5) and delivers the trigger signal.

It is particularly advantageous that the force or acceleration pickup be mounted on a bearing at the housing fixed part.

In a further development of the present invention, at least two force or acceleration pickups are provided which are mounted on different bearings for the articulating multi ball and socket member at the housing fixed part of the sensor.

The invention also provides for the acceleration pickup being mounted outside of the housing fixed part.

BRIEF DESCRIPTION OF THE DRAWINGS

The appended drawings illustrate embodiments of the present invention schematically, wherein:

FIG. 1 is a schematic block diagram of an apparatus and circuitry of the present invention;

FIG. 2 is a front view in cross section of an embodiment of the present invention showing a mechanical sensor;

FIG. 3 is a front view in cross section of another embodiment of the present invention showing a two part sensor; and FIG. 4 is a view along line II—II of FIG. 2.

DESCRIPTION OF THE PREFERRED EMBODIMENTS

With particular reference to FIG. 1, an apparatus is shown having an articulating multi ball and socket member 3 attached to housing 1. As shown in FIGS. 2 and 3, the member 3 consists of a support plate 2 solidly fixed to housing 1 and of an articulating plate 4 detachable from plate 2. A sensor 5 is fastened to the articulating plate 4. When a measurement is carried out, a test sample 6 is sensed by sensor 5. The test sample for that purpose is mounted on a test table 8 which is displaceable in the directions of arrows 7. The test table 8 is provided with graduations 9 which together with photoelectric detector means 10 act to form the test value transmitters. Only two detectors 10 are shown for the sake of overview. When the test table 8 is displaced in one of the directions of arrows 7, electric pulses are generated by the test value transmitters, these pulses controlling a counter 11.

To store the test value existing at the time of contact between the sensor 5 and the test sample in the counter 11, a force or acceleration pickup 12 is provided which is mounted on the support plate 2 solidly fixed to housing 1. At the time of contact, this pickup 12 generates a signal which stops the counter 11 and simultaneously causes the termination of the relative motion between sensor 5 and test sample 6. The counter output then can be read off at the display 13 as the test value.

When the value of counter 11 is stored, then a memory 15 is provided for that purpose as indicated in dashed lines in FIG. 1, the memory 15 is connected through a gating stage 14 to the counter 11. The gating stage 14 is controlled in time dependent manner by the signals of the test value transmitter 9,10 so that the counter value at 11 is transferred to the memory 15 only a given delay after the decay of the relative motion between sensor 5 and test sample 6 and this is when there are no longer pulses at the detector system 10. Obviously the value transferred into the memory can be displayed in a display means 16 as shown connected in dashed lines.

One embodiment of the mounting and arrangement of the force or acceleration pickup 12 is shown in FIG. 2.

The sensor 5 is screwed into an L-shaped articulating plate 4 of the articulating multi ball and socket member 3. Balls 17, 18 (19) are firmly seated on the inside of the vertical leg 4a of the articulating plate 4, of which only two are shown for the sake of simplicity, namely 17 and 18. The support plate 2 integrally joined to the housing 1 includes recesses 20, 21 (22) of which again only two are shown in FIG. 2, namely 20 and 21. Recess 20 is cylindrical, while recesses 21 and 22 are conical. A force or acceleration pickup 23 and 24 is mounted respectively in these recesses 20 and 21.

The articulating plate 4 with its balls 17–19 rests in these recesses 20–22, i.e., on the force or acceleration pickups 23 and 24. A tension spring 25 housed in the articulating plate 4 and the support plate 2 by means of flush bores 26 and 27 elastically connects the articulating and support plates 2,4 and provides a predetermined constant pressure on pickups 23 or 24. These pickups generate an electric signal which has a level that remains unchanged in the absence of a sensing process. When the workpiece 6 is being sensed, the signal level changes. This change results in a pulse, whereby the counter 11 is stopped and the relative motion between sensor 5 and workpiece 6 is shut off.

The particular advantage of the instrumentation described so far is the high reproducibility in the accurate initial position of the sensor 5.

One or more compensating spring(s) 28 may be provided for any compensation of the sensor weight, the end(s) of which spring(s) are hooked by the lower end 28a to a holding pin 29 pressed into the articulating plate 4 and by the upper end 28b into the support plate 2.

FIG. 3 shows an embodiment of an alternative solution which differs from that in FIG. 2 in that only a single acceleration pickup 30 is provided in lieu of the several force or acceleration pickups mounted in the recesses 20 and 21, this single pickup now being mounted outside on the support plate 2 which is solidly fixed to the housing 1.

The acceleration pickup 30 furthermore may be arranged at an angle of 45° to all test axes, whereby when testing the workpiece 5, the amplitudes of the generated test signals are as equal as possible for all the test axes.

We claim:

1. In an apparatus for sensing the test values at a test sample comprising a mechanical sensor moving relative to said test sample and consisting of a housing fixed part and of a movable articulating multi ball and socket part connected to said housing fixed part, and at least one test value transmitter connected to a counter, means for generating a trigger signal in said apparatus at the instant of impact between said sensor and said test sample connected to said counter and means for storing a record of a test value present at the time of impact at said test value transmitter connected after said counter, the improvement comprising:

at least one pickup (12,23,24,30) generating an electrical signal upon pressure mounted on said housing fixed part (2) of said sensor (5) delivering said trigger signal; and said pickup prestressed by pressure applied between said fixed part and said articulating part at a predetermined constant pressure, the level of the resulting electrical signal remaining unchanged in the absence of the sensing process and changing upon sensing said test sample.

2. The apparatus of claim 1, wherein said force or acceleration pickup (12,23,24) is mounted in a bearing (20,21,22) for the articulating, multi ball and socket member (3) of the housing fixed part (2).

3. The apparatus of claim 1, wherein a plurality of force or acceleration pickups (23,24) are provided which are mounted in bearings (20,21,22) for the articulating, multi ball and socket member (3) in said housing fixed part (2) of said sensor (5).

4. The apparatus of claim 1, wherein said acceleration pickup (12,39) is mounted on the outside of said housing fixed part (2).

* * * * *